_United States Patent_ [19]

Iwaki et al.

[11] 3,740,637
[45] June 19, 1973

[54] AUTOMOBILE BATTERY CHARGER WITH PROTECTION MEANS

[75] Inventors: Katsutaro Iawaki, Chiryu; Kazumasa Mori, Kariya; Masaru Ishihama; Yukio Kobayashi, both of Tokyo, all of Japan

[73] Assignee: Nippondensco Co., Ltd., Kariya-shi, Aichi-ken, Japan

[22] Filed: Aug. 31, 1971

[21] Appl. No.: 176,511

[52] U.S. Cl. .......................... 320/61, 322/28, 317/33
[51] Int. Cl. ............................................. H02j 7/14
[58] Field of Search .................... 320/48, 61, 64; 322/28, 99; 317/33

[56] References Cited
UNITED STATES PATENTS
3,332,006  7/1967  Worrell et al.................. 317/33 UX _Primary Examiner_—J. D. Miller
_Assistant Examiner_—Robert J. Hickey
_Attorney_—Cushman, Darby & Cushman

[57] ABSTRACT

A device for charging storage batteries of a vehicle comprising a voltage regulator whereby the storage batteries are charged by a DC voltage obtained by rectifying an AC output voltage from an AC generator mounted on a vehicle, particularly, an automobile, so that the voltage across the storage batteries is detected thereby controlling the interruptions of an exciting current for the AC generator. Means including diodes arranged with selected polarity connections are included so as to provide paths for both overload voltages and inadvertent reverse connections of the vehicle storage battery.

9 Claims, 5 Drawing Figures

INVENTORS
KATSUTADO IWAKI
KAZUMASA MORI
MASARU ISHIHAMA
YUKIO KOBAYASHI

BY
ATTORNEYS

AUTOMOBILE BATTERY CHARGER WITH PROTECTION MEANS

BACKGROUND OF THE INVENTION

1. Field of the Invention

This invention relates to a device for charging storage batteries mounted on a vehicle, particularly, an automobile.

2. Description of the Prior Art

A conventional device for charging storage batteries is as shown in FIG. 1, where numeral 1 shows an AC generator mounted on a vehicle, 2 an armature winding thereof, 3 an exciting winding thereof, and 4 a rectifier circuit with an external terminal 4a connected to the positive terminal of vehicle-mounted batteries 5. Numeral 6 shows a voltage regulator with a detecting terminal 6a connected to the positive terminal of the storage batteries 5, so that the voltage across the storage batteries is detected by means of a constant voltage diode 6b and transistors 6c and 6d are switched, controlling the interruptions of an exciting current passed through the exciting winding 3 of the AC generator, whereby the voltage generated by the AC generator 1 is controlled to charge the storage batteries 5 while maintaining a constant voltage across them. A terminal 6e of the voltage regulator 6, together with the negative terminal of the storage batteries, is grounded. Numeral 7 shows a switch and 8 a charge lamp inserted between a switch 7 and a charge lamp terminal 6f of the voltage regulator 6. Numeral 9 shows an external resistor connected in parallel with the charge lamp 8.

All the resistors used with the voltage regulator 6 are made of thick films with resistance materials print-sintered on an insulating substrate of ceramic, and the voltage regulator 6 thereby consists of a hybrid thick-film integrated circuit.

If, due to the limited space, etc., the abovementioned conventional device has to be mounted near an ignition device on an automobile, each element of the voltage regulator 6, especially the thick-film resistor 6g tends to deteriorate, showing a very low resistance value or a very high resistance value, as the occasion may be. Thus, the voltage regulator 6 loses its normal function, resulting in overcharge or over-discharge of the storage batteries.

To overcome these difficulties, the inventors have made an experimental study and discovered that high frequency portions generated by the ignition device are not absorbed by the storage batteries 5 but make their way into the voltage regulator 6 from the input terminal 6a, thereby damaging the resistor 6g.

SUMMARY OF THE INVENTION

An object of the invention is to provide a device for charging storage batteries of an automobile in which a diode is inserted between a ground terminal and an input terminal of a voltage regulator comprising an integrated circuit.

Since a diode is connected between a grounded terminal and an input terminal of a voltage regulator comprising an integrated circuit according to the invention, an ignition pulse induced by an ignition device is bypassed by means of the capacitive property of the above-mentioned diode to a circuit connected to the ground so as to prevent the ignition pulse from being applied to an element such as a thick-film resistor of the voltage regulator, whereby it is possible to prevent the deterioration of each element, especially the thick-film resistor of the voltage regulator. The device according to the invention, therefore, does not lose its functions because of an ignition pulse induced by the ignition device, even if it is disposed in the neighborhood of the ignition device. Instead, it charges the batteries while always maintaining a constant voltage across them.

Another object of the invention is to provide a device for charging storage batteries of a vehicle whereby the storage batteries are charged by a DC voltage obtained by rectifying an AC output voltage from an AC generator mounted on a vehicle so that the voltage across the storage batteries is detected thereby controlling the interruptions of an exciting current for the AC generator by means of a transistor, the above-described charging device further comprising a charge indication lamp actuator circuit for detecting power generated by the AC generator and switching the transistor to control the current to the charge indication lamp. The positive terminal of a first diode with its negative terminal connected to the voltage detecting terminal of the voltage regulator is connected to the positive terminal of a second diode, while the positive terminal of the second diode is connected to the ground terminal of the charge indication lamp actuator circuit, the negative terminal of the second diode being grounded.

According to the invention, an ignition pulse applied to the voltage detecting terminal of the voltage regulator from the ignition device is bypassed to the ground through the first and second diodes to prevent it from being applied to the voltage regulator, thereby preventing the resistor, transistor and other elements in the voltage regulator from being damaged by the ignition pulse.

Further, by connecting the storage batteries inversely, an excess current flowing in the charge indication lamp actuator circuit and the first diode is blocked by the second diode, so that damage to the first diode, other diodes and transistor in the charge indication lamp actuator circuit is prevented. At the same time, burning of vehicle equipments as well as the vehicle itself caused by overheating of a wire harness due to the excess current can be prevented. In addition, any abnormal event which may occur in the charging circuit is indicated by the charge indication lamp actuator circuit.

Also, according to the invention, the transistor is connected in parallel with a third diode for bypassing an abnormal negative voltage, which is applied to the last stage transistor of the voltage regulator, to a circuit connected with the ground. Therefore, an abnormally high negative voltage induced by the opening and closing of an ignition switch is bypassed by the third diode to the circuit connected to the ground, preventing the transistor in the voltage regulator from being damaged by the abnormally high voltage. Further, by connecting the storage batteries inversely, a current flows in a circuit leading from the diode to the negative terminal of the storage batteries, so that a fuse in the circuit is burned to prevent the transistor and other elements in the voltage regulator from being damaged by the abnormal voltage.

Moreover, the device according to the invention comprises a first resistor which doubles as a fuse and is connected between the ground terminal of the voltage regulator and the ground, and a second resistor which also doubles as a fuse and is connected between the ground terminal of the charge indication lamp circuit and the positive terminal of the second diode. As a result, in the event of a short circuit of the charge indication lamp, an excess current therein causes the second resistor to be burned out. Also, in the event of a short-circuiting of the field winding of the AC generator, an excess current therein causes the first resistor to be burned out. In this way, a current path where the excess current should pass is cut off, making it possible to prevent the elements including the transistor in the charge indication lamp actuator circuit from being damaged.

DESCRIPTION OF THE PREFERRED EMBODIMENTS

Figure 1:
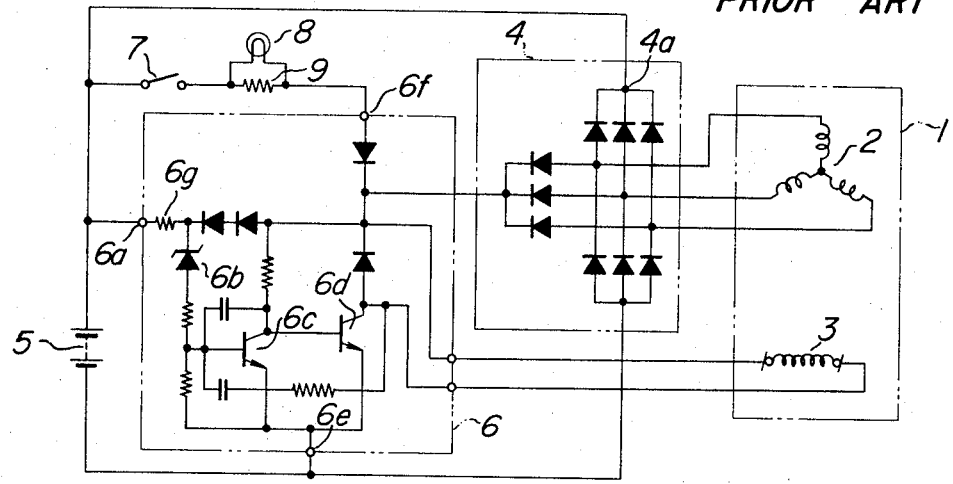
FIG. 1 is an electric circuit diagram showing a conventional device for charging storage batteries mounted on a vehicle.
Figure 2:
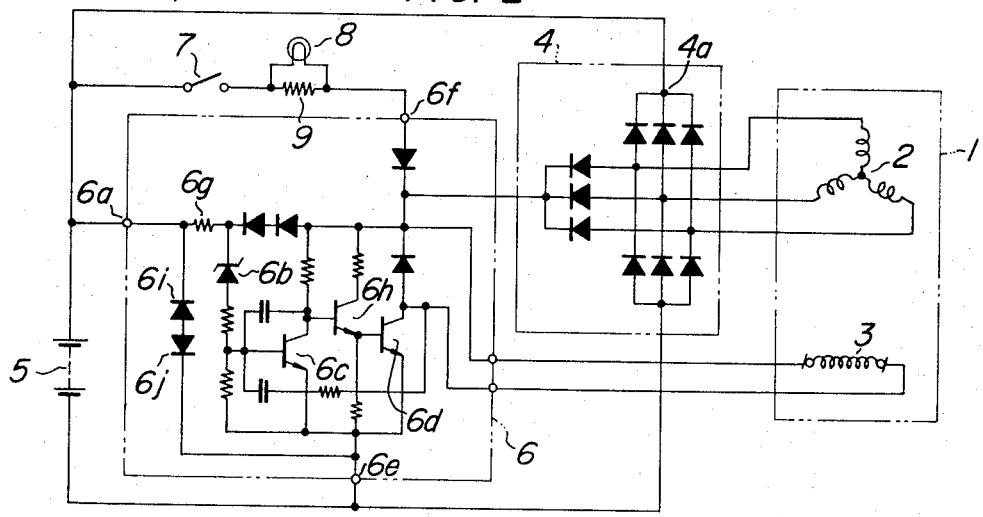
FIG. 2 is an electric circuit diagram according to the invention showing an embodiment of the device for charging storage batteries of a vehicle.
Figure 3:
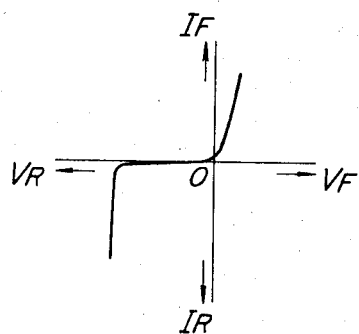
FIGS. 3 and 4 are diagrams showing the current-voltage characteristics of the diode used in the device of the invention.
Figure 4:
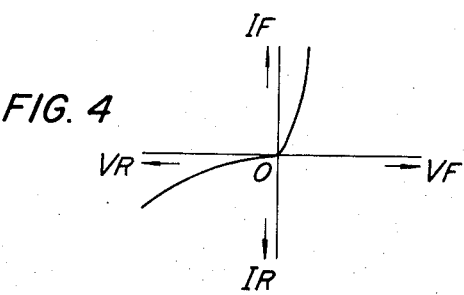

Explanation will be made now of an embodiment of the invention with reference to the drawings. In FIG. 2, similar numerals show the identical or equivalent parts as shown in FIG. 1. Numeral 6h shows a switching transistor inserted between the transistors and 6c and 6d. Numerals 6i and 6j show diodes with their anodes connected to each other. The cathode of the diode 6i is connected to the detecting terminal 6a of the voltage regulator 6, while the cathode of the other diode 6j is connected to the ground terminal 6e, both of the diodes 6i and 6j being integrated on the same pellet as the voltage regulator 6. With regard to the reverse-direction characteristic of the diodes 6i and 6j, it suffices if their breakdown voltage is such that they are not broken down by the voltage of the storage batteries 5. They may have a breakdown voltage higher than 100 V. Also, they may be of the hard breakdown type as shown in FIG. 3, that is, they may be provided with a zener characteristic, or they may be of the soft breakdown type as shown in FIG. 4.

In the above-described construction, even if an ignition pulse induced by the ignition device is applied to the detecting terminal 6a of the voltage regulator 6, it is bypassed to a grounded circuit by means of a capacitive property of the diodes 6i and 6j, thereby preventing it from being applied to the thick-film resistor 6g and the other elements in the following stages. If the positive and negative terminals of the diode 6i and the lead wire are connected inversely by mistake, lack of the diode 6j may result in the burning of the storage batteries. In other words, the diode 6j functions in such a manner that when the storage batteries are connected inversely, the diode 6i and lead wire are prevented from bunning.

This invention is not limited to the above described embodiment but finds application in various forms. For example, it may be that the cathodes of diodes 6i and 6j are connected with each other, the anode of the diode 6i is connected to the detecting terminal 6a of the voltage regulator 6, and the anode of the diode 6j is connected to the ground terminal 6e. Also, a single diode or constant-voltage diode may be employed which has a characteristic similar to the combined characteristic of the diodes 6i and 6j. As another alternative, a plurality of these diodes may be connected in series. The combination of the diodes is not limited to that of the soft breakdown type or hard breakdown type, but both of these types may be combined. Moreover, instead of integrating these diodes on the same pellet as the voltage regulator 6, they may be placed outside of the voltage regulator without running counter to the objects of the invention.

Figure 5:
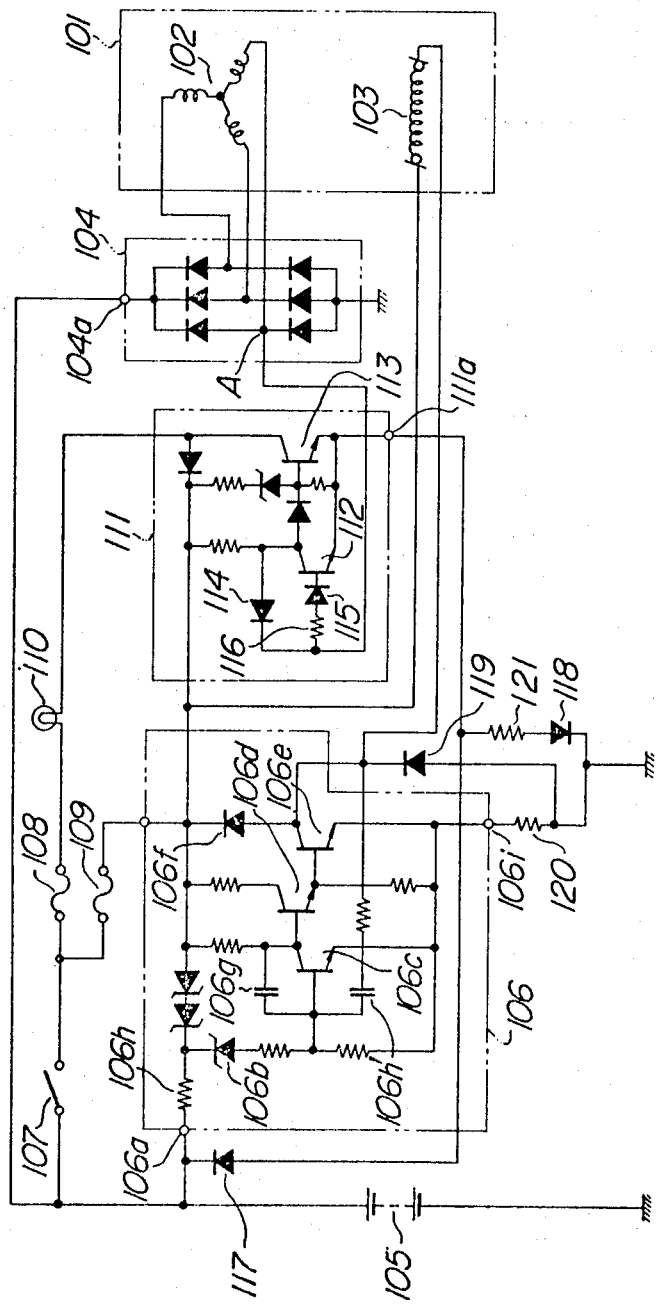
FIG. 5 is an electric circuit diagram showing another embodiment of the device for charging storage batteries of a vehicle according to the invention.

A second embodiment of the invention will be now explained with reference to FIG. 5. Numeral 101 shows a three-phase AC generator of the field rotation type mounted on a vehicle, 102 an armature winding thereof, 103 a field winding thereof, and 104 a three-phase full-wave rectifier circuit with its positive terminal 104a connected to the anode of the vehicle-mounted storage batteries 105. Numeral 106 shows a voltage regulator with its voltage-detecting terminal 106a connected to the cathode of the storage batteries 105. Numeral 106b shows a constant-voltage diode, 106c, 106d and 106e switching transistors, 106f a flywheel diode, 106g a capacitor for removing noise, and 106h a feedback capacitor. Numeral 107 shows an ignition switch, 108 and 109 fuses and 110 a charge indication lamp. Numeral 111 shows a charge indication lamp actuator circuit, 112 and 113 transistors, 114 and 115 diodes and 116 a resistor, the base of the transistor 112 being connected through the diode 115 and resistor 116 to point A corresponding to one phase of the three-phase full-wave rectifier circuit 104. The charge indication lamp 110 is inserted between the fuse 108 and the collector of the transistor 113 included in the charge indication lamp actuator circuit 111. An end of the field winding 103 of the AC generator 101 is inserted between the collector of the transistor 106e of the voltage regulator 106 and the negative terminal of the flywheel diode 106f. Numeral 117 shows a first diode with its negative terminal connected to the voltage-detecting terminal 106a of the voltage regulator 106, while the positive terminal thereof is connected to the positive terminal of the second diode 118. The positive terminal of the second diode 118 is also connected to the ground terminal 111a of the charge indication lamp actuator circuit 111. The negative terminal of the second diode 118 is grounded. Numeral 119 shows a third diode with its negative terminal connected to the collector of the last-stage transistor 106e of the voltage regulator 106, the positive terminal thereof being grounded. Numeral 120 shows a first resistor which doubles as a fuse and is inserted between the ground terminal 106i of the voltage regulator 106 and the ground. Numeral 121 shows a second resistor which also doubles as a fuse and is connected between the ground terminal 111a of the charge indication lamp actuator circuit 111 and the positive terminal of the second diode 118.

The operation of the above-mentioned second embodiment will be now explained. The voltage regulator 106 detects by means of the constant-voltage diode 106b a terminal voltage of the storage batteries 105 which is applied to the voltage detecting terminal 106a, so that the transistors 106c, 106d and 106e are switched to control the interruptions of a current flowing to the field winding 103, thereby regulating the voltage generated by the AC generator 101 to maintain a constant voltage across the storage batteries. When a voltage at point A of one phase of the three-phase full-wave rectifier circuit 104 is applied to the base of transistor 112 to charge the storage batteries 105 by means of a DC voltage through the full-wave rectifier circuit 104, the transistor 113 of the charge indication lamp actuator circuit 111 is cut off and no current flows in the charge indication lamp 110, keeping it off.

When an ignition pulse leaked from the ignition device is applied to the voltage detecting terminal 106a of the voltage regulator 106, the resistor 106h in the input stage of the voltage regulator 106 may be damaged if the voltage regulator 106 is so integrated that it lacks the diode 117. According to the invention, however, the ignition pulse applied to the voltage detecting terminal 106a exceeds forward and reverse voltages of the diodes 117 and 118 and is bypassed to a ground circuit by means of the capacitive property of the diodes 117 and 118 without being applied directly to the voltage regulator 106.

If the positive and negative terminals of the storage batteries 105 are connected inversely by mistake, that is to say, if the positive and negative terminals are grounded and connected to the voltage detecting terminal 106a respectively, lack of the diode 118 causes an excess current to flow from the cathode of the storage batteries 105 through the ground, the grounded terminal 111a of the charge indication lamp actuator circuit 111, transistor 112, diode 114 and full-wave rectifier circuit 104 to the anode of the storage batteries 105. In that case, an excess current flows also from the anode of the storage batteries 105 through the diode 117 to the anode of the storage batteries 105, damaging the transistor 112 and diodes 114 and 117. According to the invention, however, even if the anode and cathode of the storage batteries 105 are connected inversely, the diode 118 blocks a reverse current which otherwise might flow to the above-described two circuits from the storage batteries 105, thus preventing the transistor 112 and diodes 114 and 117 from being damaged. Also, when the anode and cathode of the storage batteries 105 are connected inversely, an excess current flows in a closed loop from the cathode of the storage batteries 105 through the diode 119, flywheel diode 106f, fuse 109 and ignition switch 107 to the anode, whereby the fuse 109 is burned out, thus preventing a reverse excess voltage from being applied to the transistors 106e, 106d and 106c of the voltage regulator 106 and the lead wire in the closed loop from being burned.

Further, an abnormal negative voltage of several tens of volts induced by an inductive load (not shown) as a result of opening and closing of the ignition key switch 107, which otherwise might be applied to the collectors of the transistors 106e, 106d and 106c of the voltage regulator 106, is not actually applied to them but bypassed to the ground through the diode 119. It is needless to say that the capacity of the diode 119 must be large enough to stand the abnormal negative voltage.

Moreover, when the charge indication lamp 110 is short-circuited, an excess current flows in a closed loop from the anode of the storage batteries 105 to the ground through the charge indication lamp 110, the collector and emitter of the transistor 113 of the charge indication lamp actuator circuit 111 and the second resistor 121 which doubles as a fuse. As a result, the second resistor 121 is heated and burned out, preventing the transistor 113 from being damaged, while at the same time preventing the lead wire in the closed loop and therefore other equipment from being burned out.

In addition, if the field winding 103 of the AC generator 101 is short-circuited, an excess current flows in a closed loop from the cathode of the storage batteries 105 to the ground through the field winding 103, the collector and emitter of the transistor 106e of the voltage regulator 106 and the first resistor 120 which doubles as a fuse, so that the first resistor 120 is heated and burned out, thus preventing the transistor 106e from being damaged, while at the same time preventing the lead wire in the closed loop and therefore other equipment as well as the vehicle itself from being damaged. In this case, the AC generator 101 stops generating power and therefore the transistor 113 of the charge indication lamp actuator circuit 111 is energized on receipt of a base current from the storage batteries 105, whereby the charge indication lamp 110 is lighted, indicating that the charging circuit is in an abnormal condition.

This invention is not limited to the above described embodiments but finds application in various forms. For example, the diodes 117, 118 and 119 may be replaced by a constant-voltage diode or avalanche diode with Zener or reverse avalanche characteristic.

We claim:

1. In a device for charging storage batteries of a vehicle comprising a voltage regulator wherein said storage batteries are charged by a DC voltage obtained by rectifying an AC output voltage of an AC generator mounted on a vehicle and a voltage across said storage batteries is detected thereby controlling the interruptions of an exciting current of said AC generator by means of a transistor; the improvement further comprising a charge indication lamp actuator circuit which detects the presence or absence of power generated by said AC generator and switches said transistor to control a current flow to a charge indication lamp, first and second diodes having positive and negative terminals, said first diode being connected by its positive and negative terminals to the positive terminal of the second diode and a voltage-detecting terminal of said voltage regulator respectively, the positive and negative terminals of said second diode being connected to a grounded terminal of said charge indication lamp actuator circuit and the ground respectively.

2. A device for charging storage batteries according to claim 1, wherein a transistor in a last stage of said voltage regulator is connected in parallel with a third diode for bypassing an excess negative voltage through a grounded circuit, said excess negative voltage being applied to a transistor in the last stage of said voltage regulator.

3. A device for charging storage batteries according to claim 1 further comprising a first resistor, which also functions as a fuse, inserted between the grounded terminal of said voltage regulator and the ground, and a second resistor, which also functions as a fuse, inserted between the grounded terminal of said charge indication lamp actuator circuit and the positive terminal of said second diode.

4. A voltage regulator system for controlling the charge of a storage battery in a vehicle comprising:
- a DC generator for producing a DC voltage by rectifying an AC output voltage of an AC generator mounted on a vehicle;
- means for connecting said DC generator to a storage battery for charging the same and including means for connecting an anode of said battery to a ground potential;
- a voltage regulator comprising a detecting terminal connected to a cathode of said battery, a ground terminal connected to ground potential, an input terminal connected to the cathode of said storage battery, means connected to said detecting terminal for detecting the voltage of said storage battery, switching means connected between said input terminal and said ground terminal and adapted for switching operation when said detecting means detects that the voltage of said storage battery exceeds a predetermined value, and means for operatively connecting said switching means to said AC generator thereby disenabling the operation of said AC generator in response to said switching operation of said switching means; and
- at least two diodes connected serially in reverse polarity with each other between said detecting terminal and said ground terminal.

5. A voltage regulator system for controlling the charging of a storage battery in a vehicle comprising:
- a DC generator for producing a DC voltage by rectifying an AC output voltage of an AC generator mounted on a vehicle;
- means for connecting said DC generator to a storage battery for charging the same and including means for connecting an anode of said battery to a ground potential;
- a voltage regulator comprising a detecting terminal connected to a cathode of said battery, a ground terminal connected to the ground potential, an input terminal connected to the cathode of said storage bzttery, means connected to said detecting terminal for detecting the voltage of said storage battery, switching means connected between said input terminal and said ground terminal and adapted for switching operation of said switching means;
- a charge indication lamp actuator circuit comprising an input terminal, a ground terminal connected to the ground potential, means connected to said AC generator for detecting the operation of said AC generator, and switching means connected between said input and ground terminals and responsive to the detection of said detecting means for controlling the electrical conduction between said input and ground terminals;
- a charge indication lamp connected between said input terminal of said charge indication lamp actuator circuit and the cathode of said storage battery; and
- first and second diodes connected in series between said detecting terminal and the ground potential and in parallel with said detecting means of the same, said second diode having an anode connected to the anode of said first diode through a first junction point and a cathode connected to the ground potential, said first junction point being connected to said ground terminal of said charge indication lamp actuator circuit.

6. A voltage regulator system according to claim 5 wherein said voltage regulator further comprises:
- a third diode having a cathode connected to a second junction point of said input terminal of said voltage regulator and said switching means of the same and an anode connected to a third junction point of said ground terminal of said voltage regulator and the ground potential; and
- a fuse connected between said input terminal of said voltage regulator and the cathode of said storage battery.

7. A voltage regulator according to claim 6 further comprising:
- a first resistor which serves as a fuse connected between the ground terminal of said voltage regulator and said third junction point; and
- a second resistor which serves as a fuse connected between said first junction point and said second diode.

8. A voltage regulator according to claim 4 wherein said voltage regulator further comprises:
- a third diode having a ctahode connected to a second junction point of said input terminal of said voltage regulator and said switching means of the same and an anode connected to a third junction point of said ground terminal of said voltage regulator and the ground potential; an
- a fuse connected between said input terminal of said voltage regulator and the cathode of said storage battery.

9. A voltage regulator according to claim 8 further comprising:
- a resistor which serves as a fuse connected between said ground terminal of said voltage regulator and said third junction point.

* * * * *

UNITED STATES PATENT OFFICE
CERTIFICATE OF CORRECTION

Patent No. 3,740,637                     Dated June 19, 1973

Inventor(s) Katsutaro Iwaki; Kazumasa Mori; Masaru Ishihama; Yukio Kobayashi

It is certified that error appears in the above-identified patent and that said Letters Patent are hereby corrected as shown below:

In the heading

Line [75] the first inventor's name which reads "Iawaki" should read --Iwaki--

Item [73] change "Nippondensco Co., Ltd." to --Nippondenso Co., Ltd.--

Item [30] Foreign Application Priority Data

September 3, 1970     Japan.........77317/70

September 4, 1970     Japan.........77900/70

Signed and sealed this 20th day of November 1973.

(SEAL)
Attest:

EDWARD M. FLETCHER, JR.　　　　　RENE D. TEGTMEYER
Attesting Officer　　　　　　　　　Acting Commissioner of Patents